(12) United States Patent
Tanaka et al.

(10) Patent No.: US 7,176,601 B2
(45) Date of Patent: Feb. 13, 2007

(54) PIEZOELECTRIC POWER GENERATION SYSTEM AND SENSOR SYSTEM

(75) Inventors: Hidetoshi Tanaka, Kokubunji (JP); Norio Ohkubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 10/878,249

(22) Filed: Jun. 29, 2004

(65) Prior Publication Data

US 2005/0052097 A1 Mar. 10, 2005

(30) Foreign Application Priority Data

Sep. 5, 2003 (JP) ............................ 2003-313683

(51) Int. Cl.
H01L 41/113 (2006.01)
H02N 2/00 (2006.01)
(52) U.S. Cl. ..................................... 310/339
(58) Field of Classification Search ................. 310/339
See application file for complete search history.

(56) References Cited

U.S. PATENT DOCUMENTS 5,512,795 A * 4/1996 Epstein et al. .............. 310/339
5,879,309 A * 3/1999 Johnson et al. ............. 600/552
6,580,177 B1 * 6/2003 Hagood et al. ............. 290/1 R

FOREIGN PATENT DOCUMENTS

| JP | 2003061368 A | * | 2/2003 |
| JP | 2004095967 A | * | 3/2004 |
| JP | 2005245115 A | * | 9/2005 |

* cited by examiner

Primary Examiner—Darren Schuberg
Assistant Examiner—J. Aguirrechea
(74) Attorney, Agent, or Firm—Miles & Stockbridge P.C

(57) ABSTRACT

A piezoelectric power generation system which performs a highly efficient power generation using a piezoelectric element without dependency on the direction of an externally driven vibration. The piezoelectric power generation system includes a vibrator having a beam in the form of a rod, and an impact element such as a steel ball. At one end of the beam is fixed the impact element, and at the other end of the beam, the beam is fixed to the base. The outer circumference of the impact element carries the cylinder shaped piezoelectric element. When the base vibrates due to an externally driven vibration, the vibrator vibrates in synchronization with the given vibration in the radial direction of the base to cause the impact element of the base to impact with the inner surface of the cylindrical piezoelectric element, forcing the piezoelectric element to deform and thereby generate electrical power. The dependency on the vibration direction in the vibrator is minimized to significantly improve the efficiency of power generation.

5 Claims, 12 Drawing Sheets

1: PIEZOELECTRIC POWER GENERATION SYSTEM
2: VIBRATOR
3: PIEZOELECTRIC ELEMENT
4: BASE
7: BEAM
8: IMPACT ELEMENT

34: SENSOR SYSTEM
26: PIEZOELECTRIC POWER GENERATION SYSTEM
37: COMMUNICATION ANTENNA
35: SEMICONDUCTOR INTEGRATED CIRCUIT EQUIPMENT
32: CHARGING CAPACITOR
36: SENSOR

1: PIEZOELECTRIC POWER GENERATION SYSTEM
2: VIBRATOR
3: PIEZOELECTRIC ELEMENT
4: BASE
7: BEAM
8: IMPACT ELEMENT

1a: PIEZOELECTRIC POWER GENERATION SYSTEM
2: VIBRATOR
3a: PIEZOELECTRIC ELEMENT
4a: BASE
9: IMAPACT ELEMENT

1b: PIEZOELECTRIC POWER GENERATION SYSTEM
10: CYLINDER (IMPACT ELEMENT)
11: PIEZOELECTRIC ELEMENT
13: BEAM

1c: PIEZOELECTRIC POWER GENERATION SYSTEM
11a: PIEZOELECTRIC ELEMENT

1d: PIEZOELECTRIC POWER GENERATION SYSTEM
15: PIEZOELECTRIC ELEMENT
16, 17: LIDS (END PLATES)
18: STEEL BALL (IMPACT ELEMENT)
19: BEAM
20: BASE

1e: PIEZOELECTRIC POWER GENERATION SYSTEM
15a: PIEZOELECTRIC ELEMENT

21: BASE
22: CYLINDER (IMPACTED WALL)
1f: PIEZOELECTRIC POWER GENERATION SYSTEM

1g: PIEZOELECTRIC POWER GENERATION SYSTEM

15a: PIEZOELECTRIC ELEMENT

1h: PIEZOELECTRIC POWER GENERATION SYSTEM
24: PROTECT FILM

1i: PIEZOELECTRIC POWER GENERATION SYSTEM
48: BASE
49: PIEZOELECTRIC ELEMENT

PIEZOELECTRIC POWER GENERATION SYSTEM AND SENSOR SYSTEM

CLAIM OF PRIORITY

The present application claims priority from Japanese Application JP 2003-313683 filed on Sep. 5, 2003, the content of which is hereby incorporated by reference into this application.

FIELD OF THE INVENTION

The present invention relates to a power generation technique for converting mechanical vibrational energy into electrical energy, and more particularly to an efficient applied power generation technique that uses vibrational energy to impact and strain a piezoelectric element.

BACKGROUND OF THE INVENTION

For example, in a power generation system that uses a piezoelectric element, the power is generated by arranging a terminal of a plate-like piezoelectric element to vibrate through an external stress and to resonate a free terminal to deform the piezoelectric element, or by impacting the plate-like piezoelectric element with a steel material to cause some deformation of the piezoelectric element.

The author of the present application has found that a problem resides in the power generation technique using the piezoelectric element as have been described above.

More specifically, in a power generation system that uses a plate-like piezoelectric element, while the power is generated by deforming the plate-like piezoelectric element through mechanical vibrational energy, externally driven vibration needs to be aligned with the deforming direction of the piezoelectric element, and efficient power generation cannot be achieved when the externally driven vibration is misaligned with the deforming direction of the piezoelectric element at the time of installation, or when the direction of the externally driven vibration occasionally changes.

SUMMARY OF THE INVENTION

The present invention has been made in view of the above circumstances and has an object to overcome the above problems and to provide an efficient power generation technique using a piezoelectric element, which is independent of the direction of the externally driven vibration.

These and other objects and many of the attendant advantages of the present invention will be readily appreciated, as the same becomes better understood by reference to the following detailed description when considered in connection with the accompanying drawings.

To achieve the objects and in accordance with the purpose of the invention, as embodied and broadly described herein, this invention may be summarized as follows:

The piezoelectric power generation system in accordance with the present invention includes a cylindrical piezoelectric element, a vibrator including a beam in the form of a rod and an impact element fixed to one end of the beam to impact the inner circumference of the piezoelectric element, and a base for fixing the other end of the beam. The piezoelectric element generates power by the impact element, which vibrates in an arbitrary circular direction perpendicular to the center axis of the piezoelectric element, impacting the inner circumference of the piezoelectric element.

Other aspects of the present invention are briefly described below:

In another aspect of the present invention, the piezoelectric power generation system in accordance with the present invention includes a cylindrical impact wall, a cylindrical piezoelectric element provided on the inner circumference of the impact wall, a beam in the form of a rod, having the piezoelectric element fixed at one end, and a base for fixing the other end of the beam, wherein the piezoelectric element vibrates, forced by the vibration in an arbitrary circumferential direction perpendicular to the center axis of the piezoelectric element, to impact the inner circumference of the impact wall to generate electrical power.

In still another aspect of the present invention, the piezoelectric power generation system in accordance with the present invention includes a cylindrical piezoelectric element having an end plate provided on each ends, an impact element sealed in the piezoelectric element, a beam in the form of a rod having the piezoelectric element fixed at one end, and a base for fixing the other end of the beam, and wherein when the piezoelectric element vibrates, forced by the vibration in an arbitrary circumferential direction perpendicular to the center axis of the piezoelectric element, impacts the inner circumference of the impact wall to generate electrical power.

In yet another aspect of the present invention, the sensor system in accordance with the present invention includes a sensor for capturing the information about a subject, a piezoelectric power generation system for generating power by the vibration of the subject, and a signal processing unit operating by the power generated by the piezoelectric power generation system to process and output the information obtained by the sensor, wherein the sensor is placed nearest to the subject, the piezoelectric power generation system is placed furthest from the subject, and the signal processing unit is placed between the sensor and the piezoelectric power generation system.

The effect of the present invention can be summarized as follows:

(1) using a vibrator having a large degree of freedom, the dependency on the direction of externally driven vibration during power generation can be minimized, allowing the labor for the installation and adjustment to be alleviated or eliminated, resulting in an improvement of installation of the piezoelectric power generation system.

(2) minimizing the dependency on the direction of the externally driven vibration permits flexible power generation with respect to the externally driven vibration, allowing an improvement in the efficiency of power generation in the piezoelectric power generation system.

(3) the layout of the sensor system with the piezoelectric power generation system placed at a furthest position from the subject on which the piezoelectric power generation system is to be mounted may improve the efficiency of the power supply in the sensor system.

(4) the sensor system is secured by a thread to the subject so that the installation of the sensor system is facilitated while keeping the high efficiency of power generation.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the present invention. In the drawings.

DETAILED DESCRIPTION OF THE PREFERRED EMBODIMENTS

A detailed description of one preferred embodiment of the present invention will now be given referring to the accompanying drawings. It is to be noted here that the similar members are designated with identical reference numbers and the detailed description of the parts already described in the preceding embodiment will be omitted.

First Embodiment

Figure 1:
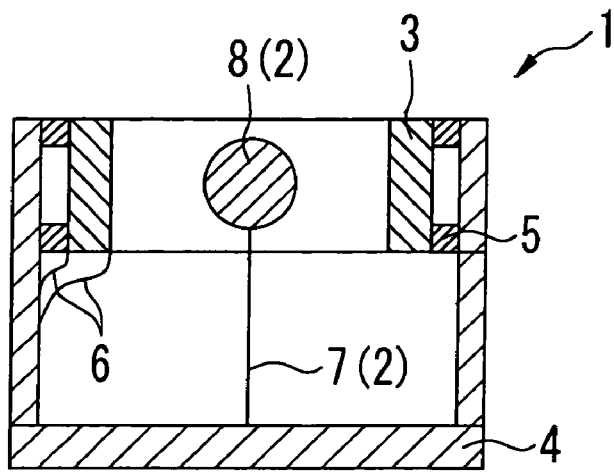
FIG. 1 shows a cross-sectional view of a piezoelectric power generation system of a first preferred embodiment in accordance with the present invention.
Figure 2:
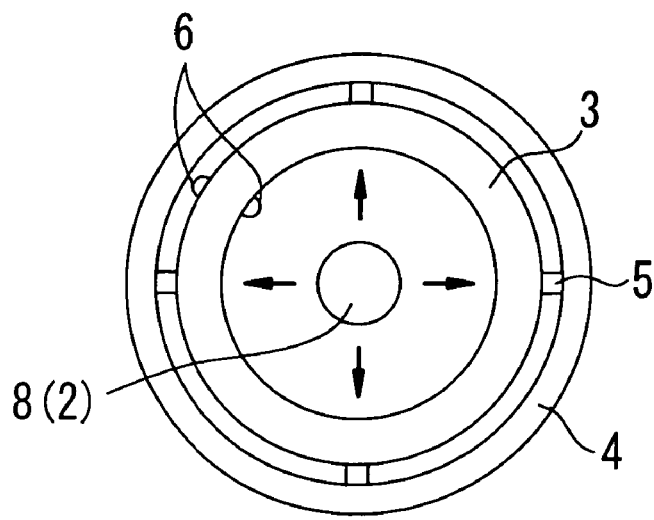
FIG. 2 shows a top plan view of a piezoelectric power generation system of FIG. 1.
Figure 3:
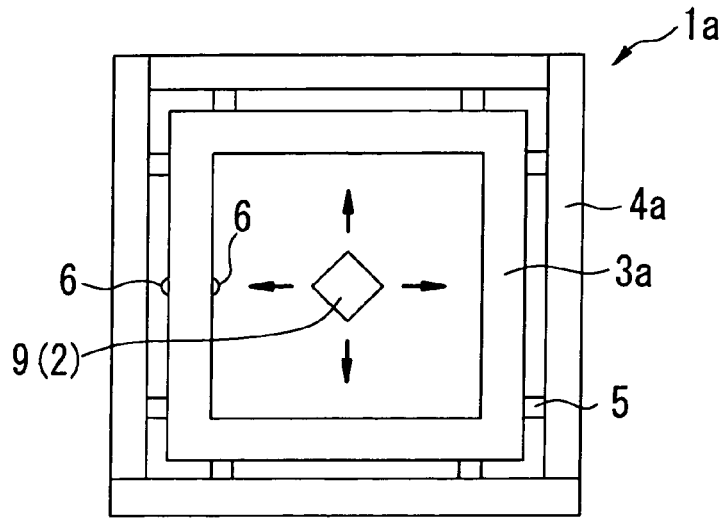
FIG. 3 shows a top plan view of another arrangement of the first preferred embodiment of the piezoelectric power generation system shown in FIG. 1.

FIG. 1 shows a cross-sectional view of a piezoelectric power generation system of first preferred embodiment in accordance with the present invention, FIG. 2 shows a top plan view of a piezoelectric power generation system of FIG. 1, FIG. 3 shows a top plan view of another arrangement of the first preferred embodiment of the piezoelectric power generation system shown in FIG. 1

In the first preferred embodiment, the piezoelectric power generation system 1 converts mechanical vibrational energy into electrical energy. The piezoelectric power generation system 1 includes, as shown in FIG. 1, a vibrator 2, a piezoelectric element 3, a base 4, a spacer 5, and a wire 6.

The vibrator 2 comprises a beam 7, and an impact element 8. The beam 7 is in the form of a columnar or a cylindrical rod, at one end of which is fixed an impact element 8. The impact element 8 may be a steel ball or the like.

The piezoelectric element 3 is in the form of, for example, a cylinder, which, when applied with a stress, deforms to generate electrical energy. The base 4 is in the form of a hollow column having a basal surface at one end, the inner top surface of the base 4 accepts the piezoelectric element 3 with a plurality of spacers 5 interposed therebetween and placed at an even interval. The bottom of the base 4 is fixed to the other end of the beam 7. The piezoelectric element 3 is connected to the wire 6 for carrying the electrical energy generated by the piezoelectric element 3.

FIG. 2 shows a top plan view of the piezoelectric power generation system 1.

As shown in the figure, the impact element 8 is provided so as to be at the center of the piezoelectric element 3. The arrangement of the impact element 8 needs not to be coaxial; however, the impact element 8 is preferably at the center of the piezoelectric element 3 such that the vibrator 2 is balanced.

In addition, the impact element 8 need not be in the form of a ball and may be in any given form, however the impact surface abutting the piezoelectric element 3 of the impact element 8 is at a uniform distance when the vibrator 2 is balanced.

Between the piezoelectric element 3 and the base 4, a spacer 5 is preferably inserted for securing, however the piezoelectric element 3 and the base 4 can be directly secured without the spacer 5. The inner and outer surface of the piezoelectric element 3 are connected to the wire 6.

The piezoelectric element 3 may also be formed by combining a plurality of split piezoelectric elements, and in such a case, the wire should be connected to the electrodes formed on the inner and outer surface of every split piezoelectric element.

In the following, the operation of the piezoelectric power generation system 1 will be described in greater detail.

The base 4 vibrates due to externally driven vibration applied thereto, causing the vibrator 2 to vibrate in synchronization with the given vibration in the radial direction of the base 4. When the amplitude of vibration of the vibrator 2 exceeds a predetermined level, the impact element 8 of the vibrator 2 impacts the inner surface of the cylindrical piezoelectric element 3, which strains by the force and generates electrical power.

The number of impacts by the impact element 8 may be such that the impact element 8 impacts the inner surface of the piezoelectric element 3 at every vibrational movement of the vibrator 2, or such that the impact element 8 impacts the inner surface of the piezoelectric element 3 for only some of the vibrational movements of the vibrator 2.

The impact element 8 is preferably made of a hard material, such as a metal or aceramic, and preferably a material that generates power when impacting the piezoelectric element 3. The beam 7 is made of a metal such as soft iron, phosphor bronze orthe like, and is preferably made of a material such as soft iron and phosphor bronze, which have spring-like characteristics. The material for the piezoelectric element 3 includes lead zirconate titanate ceramics, lead titanate ceramics, and lead metaniobate ceramics.

FIG. 3 shows a top plan view of another preferred embodiment of a piezoelectric power generation system 1a.

The piezoelectric power generation system 1a includes, as similar to the system shown in FIG. 1, a vibrator 2, a piezoelectric element 3a, a base 4a, a spacer 5, and a wire 6. The vibrator 2 comprises a beam 7 (see FIG. 1) and an impact element 9.

The difference from the embodiment shown in FIG. 1 is the form of the piezoelectric element 3a, the base 4a, and the impact element 9. The base 4a is in the form of a hollow square column with a bottom, and the piezoelectric element 3a also is in the form of a square cylinder. The impact element 9 also is in the form of a square cylinder.

In a manner similar to the embodiment shown in FIG. 1, the vibrator 2 vibrates in synchronization with a given vibration of the base 4a, causing the impact element 9 of the vibrator 2 to impact the inner surface of the piezoelectric element 3a, so that the piezoelectric element 3a generates electrical power.

As has been described above with reference to FIG. 1, the piezoelectric power generation system 1a may have the piezoelectric element 3a and the base 4a directly secured without the spacer 5. The form of the impact element 9 can be arbitrary, for example, the piezoelectric element 3a may be in the form of a square cylinder, or a given polygon having more apexes than a triangle, or an oval cylinder.

In the first preferred embodiment of the present invention, the dependency on the vibrational direction of the vibrator 2 thereby is minimized to improve the efficiency of power generation of the piezoelectric power generation system 1 and the piezoelectric power generation system 1a.

Second Embodiment

Figure 4:
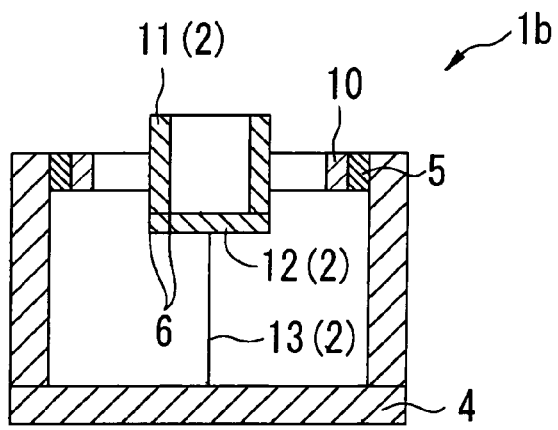
FIG. 4 shows a cross-sectional view of a piezoelectric power generation system of a second preferred embodiment in accordance with the present invention.
Figure 5:
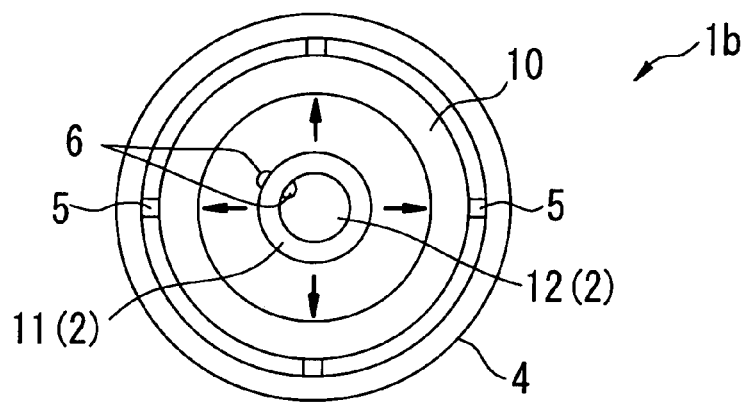
FIG. 5 shows a top plan view of the piezoelectric power generation system shown in FIG. 4.
Figure 6:
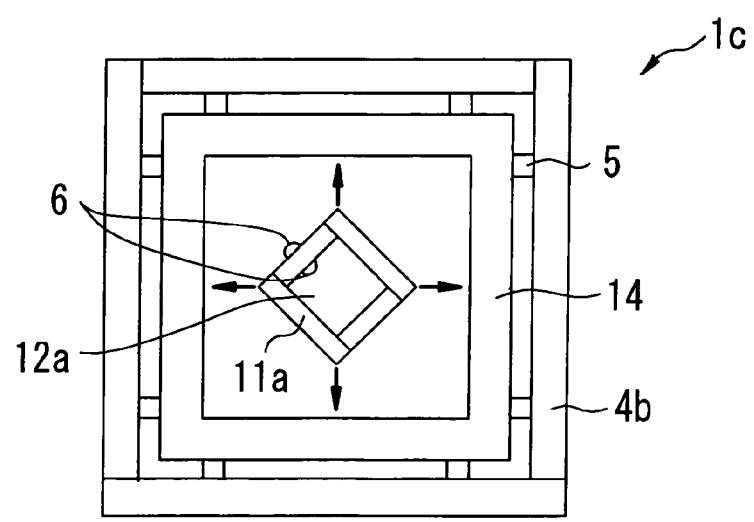
FIG. 6 is a top plan view of another arrangement of the second preferred embodiment of the piezoelectric power generation system shown in FIG. 4.

FIG. 4 shows a cross-sectional view of a piezoelectric power generation system of a second preferred embodiment in accordance with the present invention, FIG. 5 shows a top plan view of the piezoelectric power generation system shown in FIG. 4, FIG. 6 is a top plan view of another arrangement of the second preferred embodiment of the piezoelectric power generation system shown in FIG. 4.

In the second preferred embodiment of the present invention, the piezoelectric power generation system 1b includes a vibrator 2, a base 4, a spacer 5, a wire 6, and a cylinder (impact wall) 10, as shown in FIG. 4.

In this embodiment, the vibrator 2 comprises a piezoelectric element 11, a lid 12, and a beam 13. The piezoelectric element 11 is in the form of a cylinder and the bottom of one end of the cylinder of the piezoelectric element 11 has the hard lid 12. The wire 6 is connected to the piezoelectric element 11 for carrying electrical energy generated by the piezoelectric element 11.

The lid 12 has one end of the beam 13 in the form of a column or a cylindrical rod fixed. The base 4 is in the form of a hollow cylinder having a bottom at one end, and the bottom of the base 4 is fixed to the other end of the beam 13. The top inner surface of the base 4 has a hard cylinder 10 secured with interposed spacers 5 spaced apart each from other at an even distance.

FIG. 5 shows a top plan view of the piezoelectric power generation system 1b.

The piezoelectric element 11 is placed at the center of the cylinder 10 as shown in the figure. The placement of the piezoelectric element 11 needs not to be at the center of the cylinder 10, however it is preferable to be at the center of the cylinder 10 such that the vibrator 2 is balanced.

The operation of the piezoelectric power generation system 1b in accordance with the second preferred embodiment will be described in greater detail below.

The base 4 vibrates due to the externally driven vibration. The vibrator 2 thereby vibrates in synchronization with the given vibration in the radial direction of the base 4. When the amplitude of vibration of the vibrator 2 exceeds a predetermined level the piezoelectric element 11 of the vibrator 2 impacts the inner surface of the cylinder 10, causing the piezoelectric element 11 to generate electrical power.

The piezoelectric element 11 may be made of a material such as lead zirconate titanate ceramics, lead titanate ceramics, or lead metaniobate ceramics, as similar to the piezoelectric element used in the first preferred embodiment. The beam 13 is made of a metal such as soft iron or phosphor bronze, but is preferably made of a spring metal such as soft iron or phosphor bronze, which have spring-like characteristics.

The cylinder 10 is preferably made of a hard material such as metal, and is preferably made of a material that generates power when the piezoelectric element 11 impacts the cylinder 10.

The cylinder 10 may also be made of, for example, a material other than a metal, such as a piezoelectric element (impact wall piezoelectric element). In such a case, the piezoelectric element 11 impacts the cylinder 10, which is a piezoelectric element, such that both the piezoelectric element 11 and the cylinder 10 of piezoelectric element generate electrical power.

In this case, the cylinder 10 of a piezoelectric element is connected with a wire to carry the generated electrical energy. The cylinder 10, which is made of a piezoelectric element, can be split into a number of fragments, and in the case of split cylinder, each of fragments should have electrodes to output the electrical energy.

FIG. 6 shows a top plan view of another arrangement of the piezoelectric power generation system 1c in accordance with the present invention.

The piezoelectric power generation system 1c is made of a vibrator 2, a base 4b, a spacer 5, a wire 6, and a cylinder (impact wall) 14, and the vibrator 2 is made of a piezoelectric element 11a, a lid 12a, and a beam 13, as similar to that shown in FIG. 4.

The difference from the arrangement shown in FIG. 4 is the form of the base 4b, the piezoelectric element 11a, the lid 12a, and the cylinder 14. The base 4b is in the form of a hollow square column with a bottom. Similarly, the piezoelectric element 11a is in the form of a square cylinder and the lid 12a is also square. The cylinder 14 is in the form of a square frame.

In a manner similar to the embodiment shown in FIG. 4, the vibrator 2 vibrates in synchronization with a given vibration of the base 4b to cause the piezoelectric element 11a of the vibrator 2 to impact the inner surface of the cylinder 14 so as for the piezoelectric element 11a to generate electrical power.

In the case of the piezoelectric power generation system 1c, the piezoelectric element 11a and the base 4b are directly secured without using the spacer 5, as described above with reference to FIG. 3. The piezoelectric element 11a and/or the cylinder 14 may be in the form of a cylindrical polygon having more apexes than a triangle or an oval cylinder.

Furthermore, the cylinder 14 may be a piezoelectric element. In such a case, the cylinder 14 should accept the wire to carry the electrical energy. The impact of the piezoelectric element 11a onto the cylinder 14, which is made of a piezoelectric element, allows both the piezoelectric element 11a and the cylinder 14 to generate electrical power. The cylinder 14 can be split into a number of fragments, in which case each of the fragments should have electrodes to output the electrical energy.

As can be seen from the foregoing, the dependency on the vibrational direction on the vibrator 2 can be minimized in the second preferred embodiment of the present invention to improve the efficiency of power generation of the piezoelectric power generation systems 1b and 1c.

Third Embodiment

Figure 7:
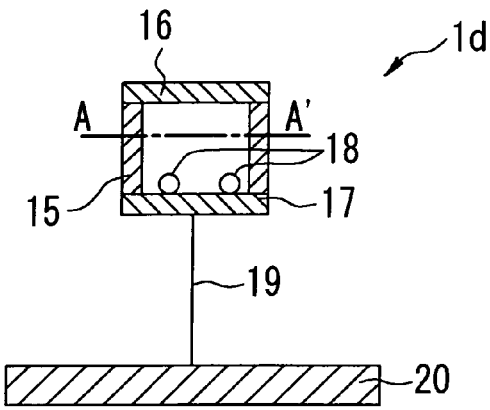
FIG. 7 shows a cross-sectional view of a piezoelectric power generation system of a third preferred embodiment in accordance with the present invention.
Figure 8:
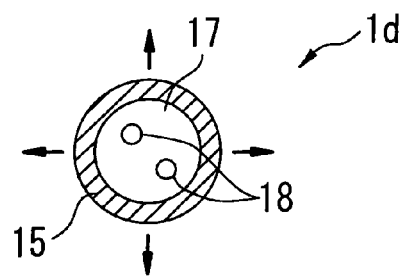
FIG. 8 shows a cross-sectional view of the piezoelectric power generation system shown in FIG. 7 along the line A–A' of FIG. 7.
Figure 9:
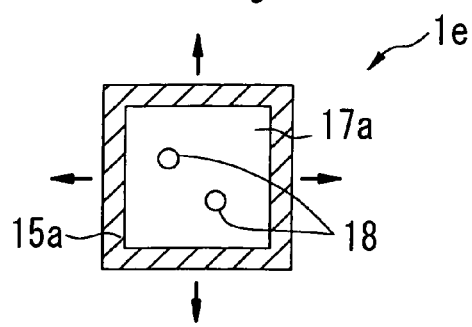
FIG. 9 shows a top plan view of another arrangement of the piezoelectric power generation system shown in FIG. 7.

FIG. 7 shows a cross-sectional view of a piezoelectric power generation system of a third preferred embodiment in accordance with the present invention, FIG. 8 shows a cross-sectional view of the piezoelectric power generation system shown in FIG. 7 along the line A–A' of FIG. 7, and FIG. 9 is a cross-sectional view of another arrangement of the piezoelectric power generation system shown in FIG. 7.

In the third preferred embodiment of the present invention, the piezoelectric power generation system 1d of the third preferred embodiment includes, as shown in FIGS. 7 and 8, a piezoelectric element 15, lids (end plates) 16 and 17, a steel ball (impact element) 18, a beam 19, and a base 20. The base 20 is in the form of a plate, on the center of which one end of the beam 19 is fixed, which beam is in the form of a cylinder or columnar rod.

The piezoelectric element 15 is in the form of a cylinder and the lids 16 and 17 are provided at each end of the cylinder of the piezoelectric element 15. In the space confined by the piezoelectric element 15, and the lids 16 and 17, a steel ball 18 is sealed, and the other end of the beam 19 is fixed to the lid 17. In FIG. 7, there are two steel balls 18 confined therein; however, the number of the steel balls 18 may be any number more than one.

The vibrator is formed by the piezoelectric element 15, the lids 16 and 17, and the beam 19. The vibrator vibrates in synchronization with the externally driven vibration in the radial direction of the piezoelectric element 15.

Next, the operation of the piezoelectric power generation system 1d in accordance with the preferred embodiment will be described in greater detail below.

When the base 4 vibrates due to externally driven vibration, the vibrator vibrates in synchronization with the given vibration in the radial direction of the beam 19. When the amplitude of vibration of the vibrator exceeds a predetermined level, the steel ball 18 impacts the inner surface of the piezoelectric element 15, causing the piezoelectric element 15 to generate electric power.

The vibrator may be such that the steel ball 18 impacts the inner surface of the piezoelectric element 15 for each vibration, or such that the steel ball 18 impacts the inner surface of the piezoelectric element 15 for only some of the vibrations.

The piezoelectric element 15 may be made of a material including, for example, lead zirconate titanate ceramics, lead titanate ceramics, or lead metaniobate ceramics. The beam 19 is made of a metal, such as, soft iron and phosphor bronze, and is preferably made of spring-like soft iron, spring-like phosphor bronze or the like, or a metal having spring-like characteristics. The steel ball 18 is preferably made of a hard material, which may generate electrical power when the steel ball 18 impacts the inner surface of the piezoelectric element 15.

The piezoelectric element 15 may also be split into a number of fragments. In such a case, each split fragment of piezoelectric element should have electrodes to output electrical energy. The spacing of the split piezoelectric elements has to be less than the diameter of the steel ball 18. The wire for carrying the electric energy thus generated should be placed in a manner similar to the wire 6 of FIG. 4.

In addition, by forming the lids 16 and 17 from the piezoelectric element for end plates, the vibration in the center axis direction of the beam 19 moves the steel ball 18 vertically up and down to impact the lids 16 and 17 of piezoelectric element to generate electric power. In this way, the efficiency of power generation can be improved.

FIG. 9 shows a top plan view of another arrangement of the piezoelectric power generation system 1e in accordance with the present invention.

The piezoelectric power generation system 1e comprises a piezoelectric element 15a, a lid 17a, a steel ball 18, a beam 19, and a base 20 (see FIG. 7), as similar to that shown in FIG. 7. The difference from the system shown in FIG. 7 is the shape of the piezoelectric element 15a and the lid 17a.

The piezoelectric element 15a is in the form of square cylinder, and the lid 17a is square accordingly. The lid 17a is not only provided to the bottom of the piezoelectric element 15a but also to the top to confine the steel ball 18 within a space surrounded by the piezoelectric element 15 and the two lids 17a.

As similar to the system shown in FIG. 7, the vibrator vibrates in synchronization with the given vibration of the base to impact the inner surface of the piezoelectric element 15a with the steel ball 18 so as for the piezoelectric element 15a to generate electrical power.

In the piezoelectric power generation system 1e, the piezoelectric element 15a may be in the form of a square cylinder, or a given polygon having more apexes than a triangle, or an oval cylinder.

In accordance with the third preferred embodiment of the present invention, the dependency on the vibrational direction of the vibrator can be eliminated, allowing significant improvement of the efficiency of power generation of the piezoelectric power generation system 1d and 1e.

Fourth Embodiment

Figure 10:
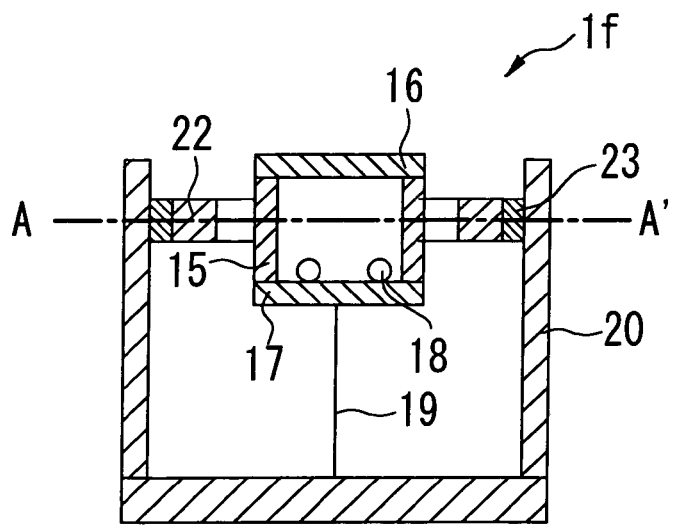
FIG. 10 shows a cross-sectional view of a piezoelectric power generation system of a fourth preferred embodiment in accordance with the present invention.
Figure 11:
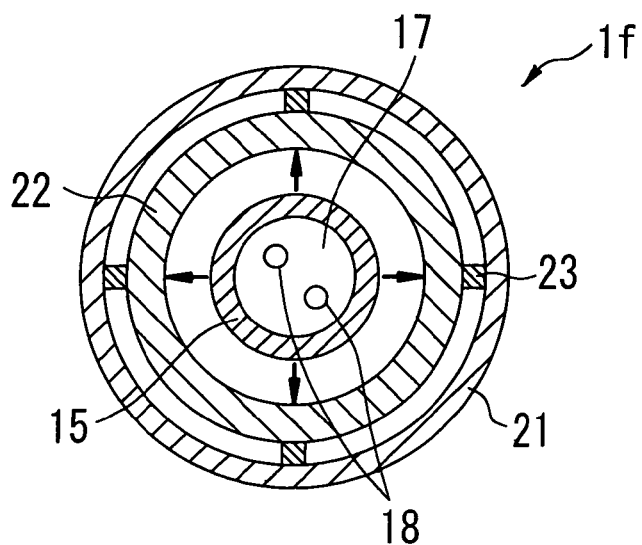
FIG. 11 shows a cross-sectional view of the piezoelectric power generation system shown in FIG. 10, along the line A–A' of FIG. 10.

FIG. 10 shows a cross-sectional view of the piezoelectric power generation system of the fourth preferred embodiment in accordance with the present invention, and FIG. 11 shows a cross-sectional view of the piezoelectric power generation system of FIG. 10 along the line A–A' of FIG. 10.

In the fourth preferred embodiment, the piezoelectric power generation system 1f comprises a base 21, a cylinder (impact wall) 22, and a spacer 23, in addition to the arrangement similar to the third preferred embodiment of FIG. 7, including a piezoelectric element 15, lids 16 and 17, a steel ball 18, and a beam 19, as shown in FIG. 10.

The structure of the piezoelectric element 15, the lids 16 and 17, the steel ball 18, and the beam 19 will not be described since these members (see FIG. 7) are identical to the preceding embodiment. The base 21 is made of a hollow cylinder having a bottom at one end, and the other end of the beam 19 is fixed to the bottom of the base 4.

On the top inner surface of the base 21, a cylinder 22 of a hard material is secured with a plurality of spacers 23 interposed therebetween and spaced apart at an even interval. The cylinder 22 is provided here for serving as a stopper for preventing plastic deformation of the beam 19.

When the vibration of a vibrator comprising the piezoelectric element 15, the lids 16 and 17, and the beam 19 exceeds a certain amplitude, the vibrating beam 19 is out of the tolerance of the material. For this reason, the cylinder 22 is placed at a position where the beam 19 may not undertake a plastic deformation. Thus, the cylinder 22 functions as a stopper for preventing plastic deformation of the beam 19.

FIG. 11 shows a cross-sectional view of a piezoelectric power generation system 1f.

As shown in the figure, the piezoelectric element 15 is placed at the center of the base 21. The placement of the piezoelectric element 15 needs not necessarily to be on the center, but is preferably at the center of a hard base 21 such that the vibrator is balanced.

Next, the operation of the piezoelectric power generation system 1f in accordance with the preferred embodiment will be described in greater detail below.

When the base 21 vibrates, due to an externally driven vibration, the vibrator vibrates in synchronization with the given vibration in the radial direction of the base 21. Then, when the amplitude of vibration of the vibrator exceeds a predetermined level, the steel ball 18 impacts the inner surface of the piezoelectric element 15 while the cylinder 22 impacts the surface of the piezoelectric element 15 such that the piezoelectric element 15 generates electrical power.

The cylinder 22 can be a cylindrical piezoelectric element, and in such a case the steel ball 18 impacts the inner surface of the piezoelectric element 15 causing the piezoelectric element 15 to generate electrical power, and the piezoelectric element 15 in turn impacts the cylinder 22 causing the cylinder 22 to generate electrical power. In conclusion, the piezoelectric element 15 and the cylinder 22 both generate electrical power.

The vibrator may be such that the piezoelectric element 15 impacts the inner surface of the cylinder 22 for every vibration, or may be such that the piezoelectric element 15 impacts the inner surface of the cylinder 22 for only some of the vibrations. The wire carrying the electrical energy generated by the piezoelectric element 15 is placed in a similar manner to that illustrated in FIG. 4. Similarly, the cylinder 22 is also connected with a wire to carry electrical energy.

In addition, by forming the lids 16 and 17 from the piezoelectric element for end plates, the vibration in the center axis direction of the beam 19 moves the steel ball 18 vertically up and down to impact the lids 16 and 17 to generate electrical power. In this way the power generation efficiency is further improved. The number of steel ball(s) 18 may be any number more than one.

In this manner, and in accordance with the fourth preferred embodiment of the present invention, both the inner surface and the outer surface of the piezoelectric element 15 generate electrical power, allowing a significant improvement in the efficiency of power generation of the piezoelectric power generation system 1f.

Figure 12:
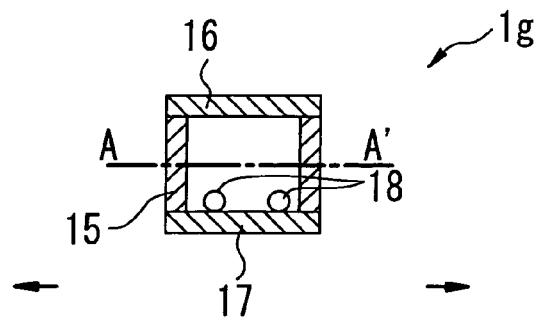
FIG. 12 shows a cross-sectional view of another arrangement of the piezoelectric power generation system in accordance with the present invention.
Figure 13:
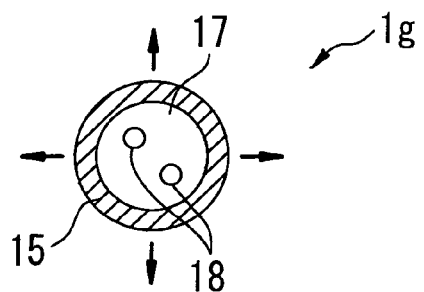
FIG. 13 shows a cross-sectional view of the piezoelectric power generation system shown in FIG. 12, along the line A–A' of FIG. 12.

The piezoelectric power generation system 1g, for example, may be formed of the piezoelectric element 15, the lids 16 and 17, and the steel ball 18 as shown in FIGS. 12 and 13. In this case, the piezoelectric power generation system 1g is considered to be similar to the arrangement of the piezoelectric power generation system 1d of FIG. 7, except for the beam 19 and the base 20 being eliminated.

The piezoelectric element 15 may be split into a number of fragments. In such a case, each split fragment of the piezoelectric element should have electrodes to output electrical energy. The spacing of the split piezoelectric fragments has to be less than the diameter of the steel ball 18. The wire that carries the electric energy thus generated should be placed in a manner similar to the wire 6 of FIG. 4.

In this arrangement, as similar to the piezoelectric power generation system 1d of FIG. 7, the steel ball 18 impacts the piezoelectric element 15 to cause it to generate electrical power when the given vibration in the radial direction of the piezoelectric element 15 exceeds a predetermined amplitude.

As has been described above in the preceding preferred embodiments, by forming the lids 16 and 17 of piezoelectric element, the vibration in the center axis direction of the piezoelectric element 15 moves the steel ball 18 vertically up and down to impact the lids 16 and 17, allowing a further improvement in the efficiency of power generation.

Figure 14:
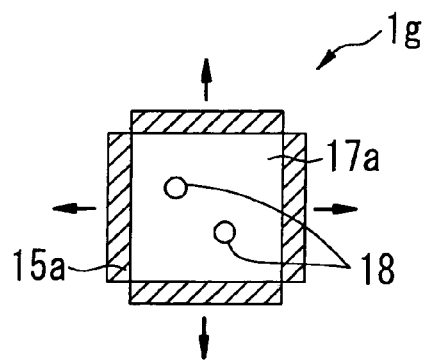
FIG. 14 shows a cross-sectional view of another arrangement of the piezoelectric power generation system shown in FIG. 12.

The piezoelectric power generation system 1g may also be formed of the piezoelectric element 15a in the form of a square cylinder and the square lid 17a, as shown in FIG. 14. The steel ball 18 is confined in the space surrounded by the square cylinder piezoelectric element 15a and the two lids 17a. The piezoelectric element 15a may also be in the form of a polygonal cylinder having more apices than a triangle, or an oval cylinder.

Fifth Embodiment

Figure 15:
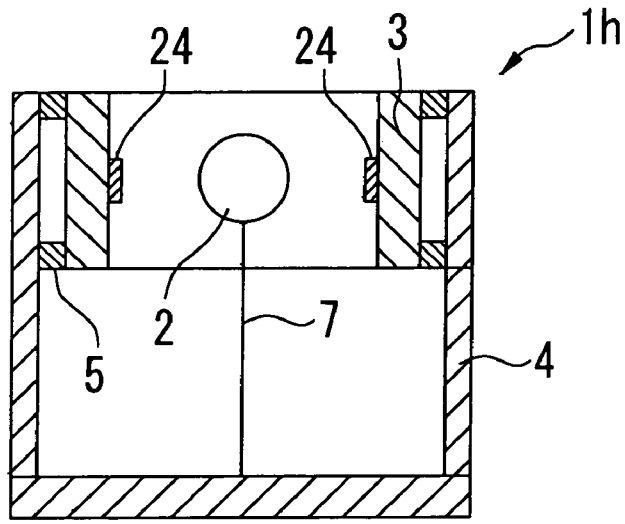
FIG. 15 shows a cross-sectional view of a piezoelectric power generation system of the fifth preferred embodiment in accordance with the present invention.

FIG. 15 shows a cross-sectional view of a piezoelectric power generation system of a fifth preferred embodiment in accordance with the present invention.

In the fifth preferred embodiment, the piezoelectric power generation system 1h includes a protective film 24 in addition to the piezoelectric power generation system 1 elements of the first preferred embodiment (FIG. 1) including the vibrator 2, made of the beam 7 and the impact element 8, the piezoelectric element 3, the base 4, the spacer 5, and the wire 6.

The protective film 24 is formed on the inner sidewall of the piezoelectric element. The protective film 24 serves as a protector of the piezoelectric element 3 to protect the piezoelectric element 3 from the shock when the impact element 8 impacts the inner surface of the piezoelectric element 3. The protective film 24 may be provided on an entirely the inner surface of the piezoelectric element 3, or at the spot of impact with the impact element 8.

In accordance with the fifth preferred embodiment of the present invention, the protective film 24 allows improvement of the reliability of the piezoelectric power generation system 1h.

The protective film 24 in accordance with the fifth preferred embodiment may also be formed at the impact spot of the piezoelectric power generation system of the preceding first to fourth preferred embodiments shown in FIGS. 3 to 14.

Sixth Embodiment

Figure 16:
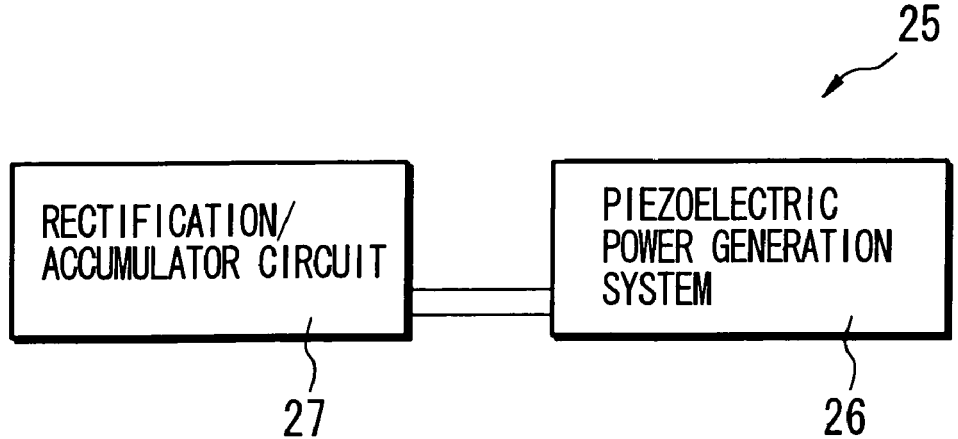
FIG. 16 shows a schematic block diagram of a piezoelectric power generation system in accordance with a sixth preferred embodiment of the present invention.
Figure 17:
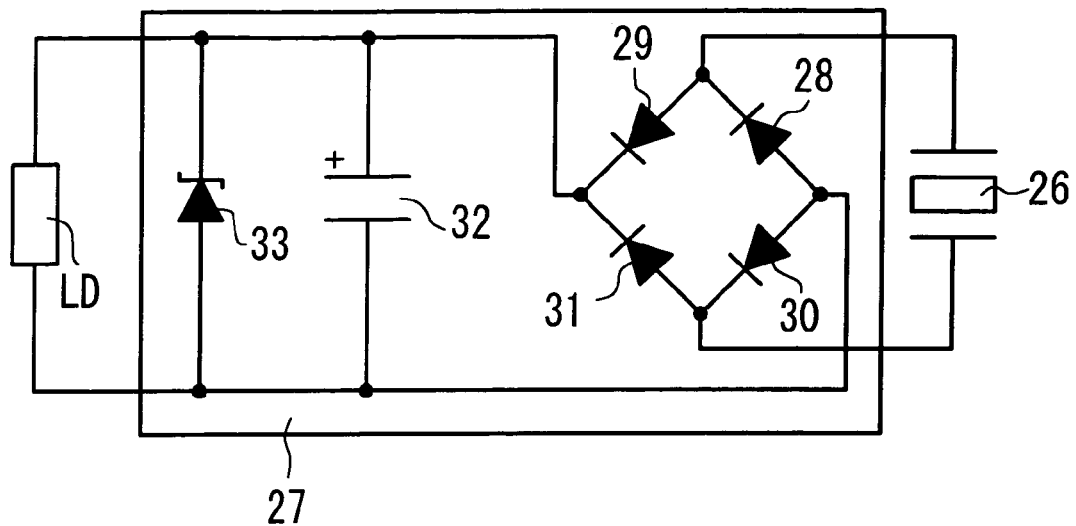
FIG. 17 shows a schematic circuit diagram of an exemplary rectification/accumulator circuit provided in the piezoelectric power generation system of FIG. 16.
Figure 18:
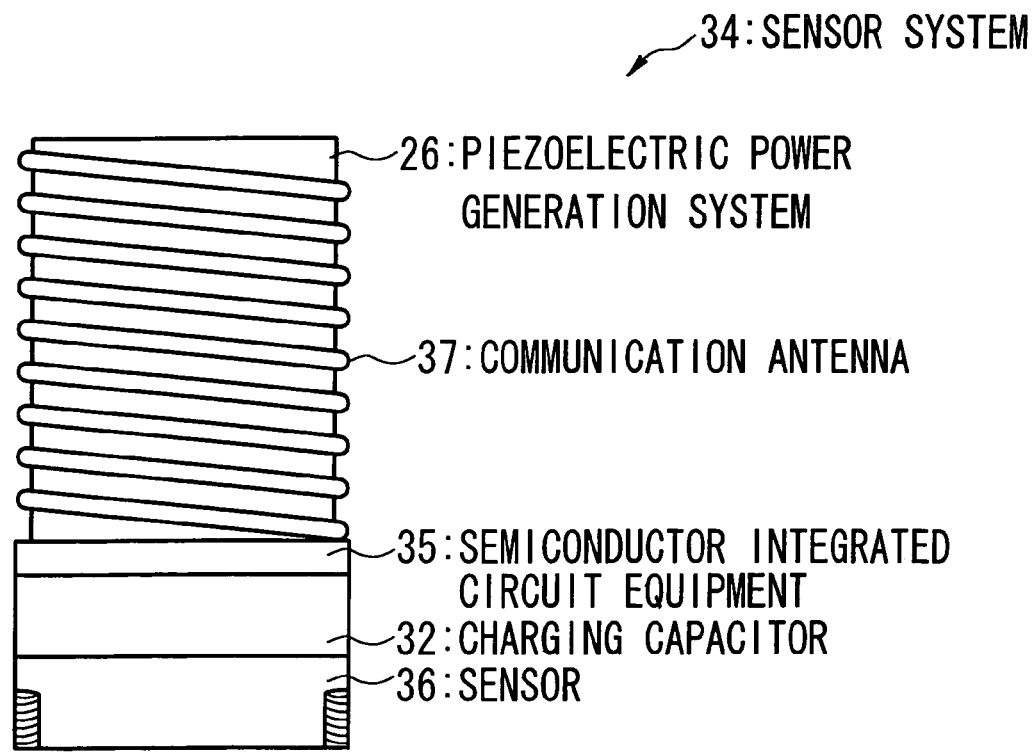
FIG. 18 shows a schematic diagram of an exemplary sensor system in accordance with the sixth preferred embodiment of the present invention.
Figure 19:
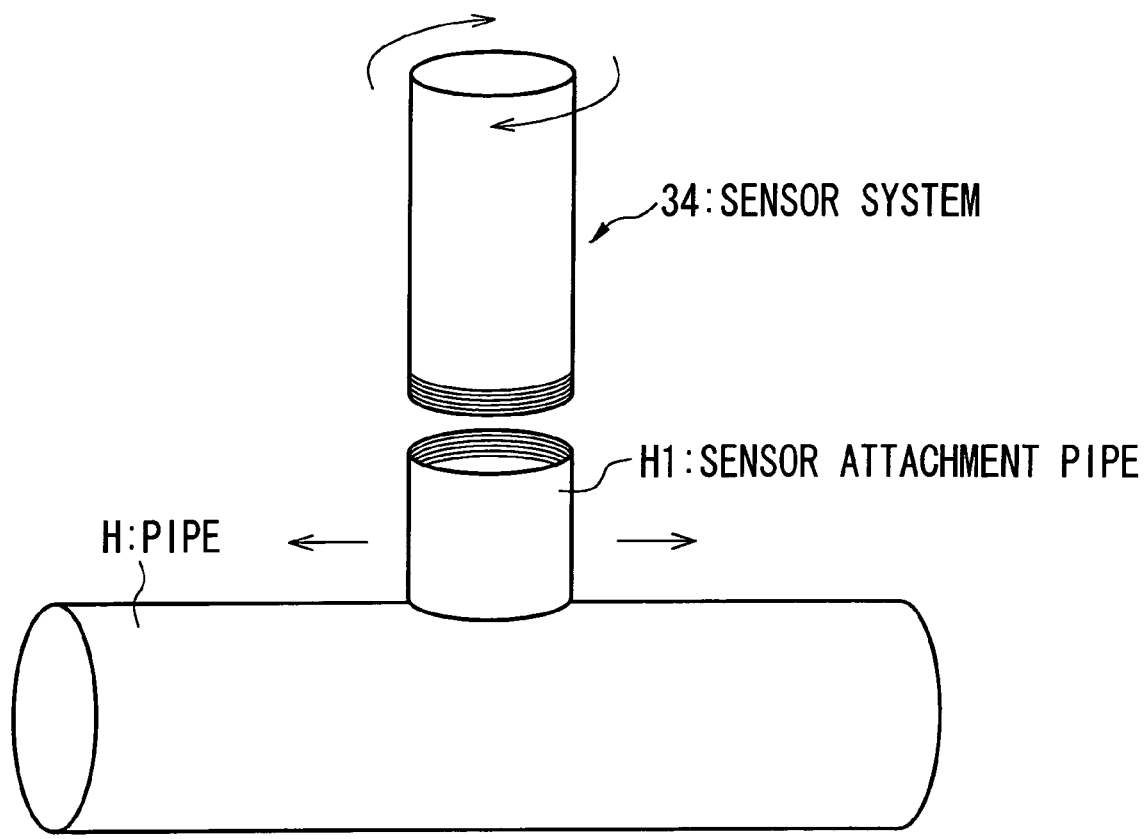
FIG. 19 shows a schematic diagram of a typical installation of the sensor system of FIG. 18.
Figure 20:
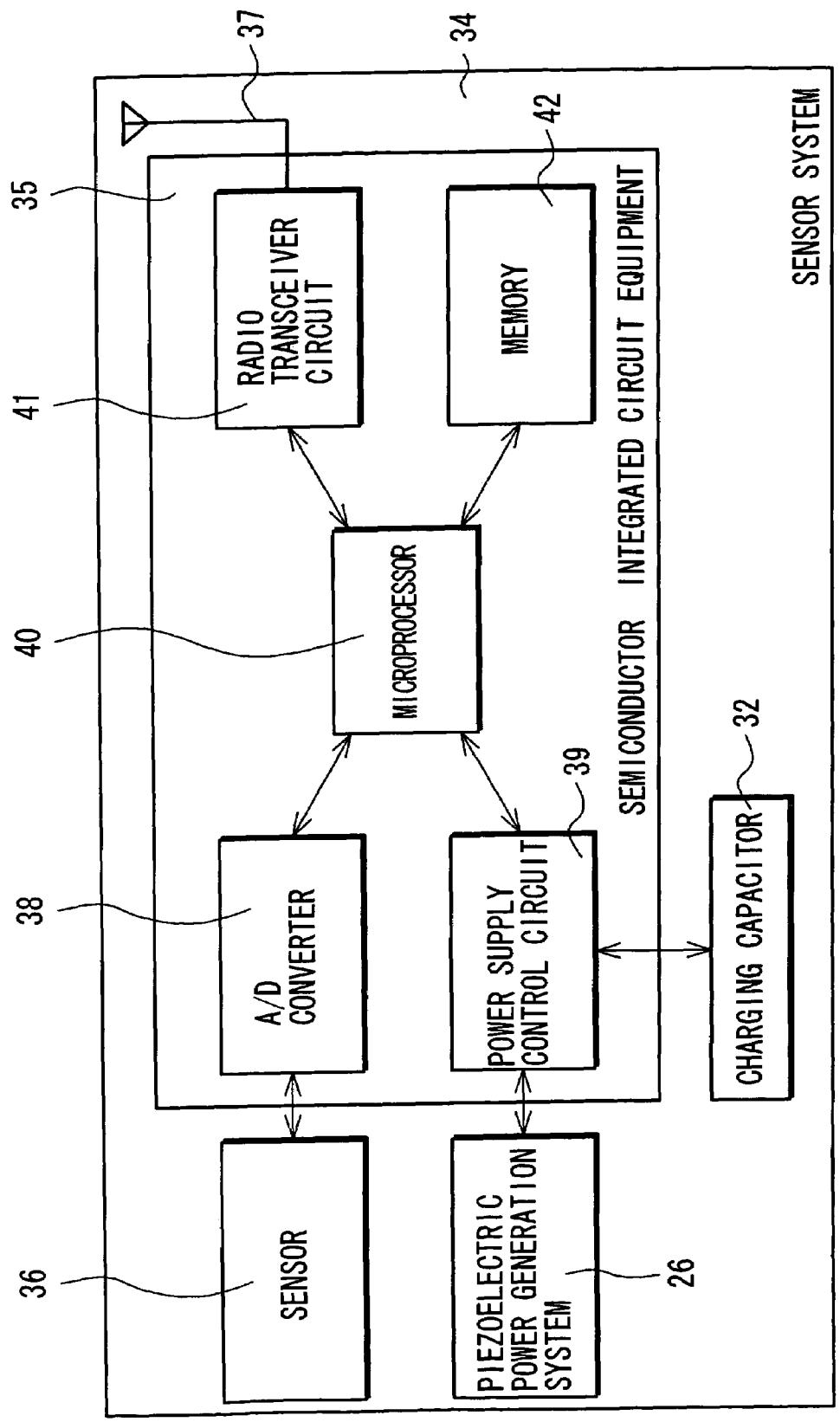
FIG. 20 shows a schematic block diagram of an exemplary arrangement of the sensor system of FIG. 18.
Figure 21:
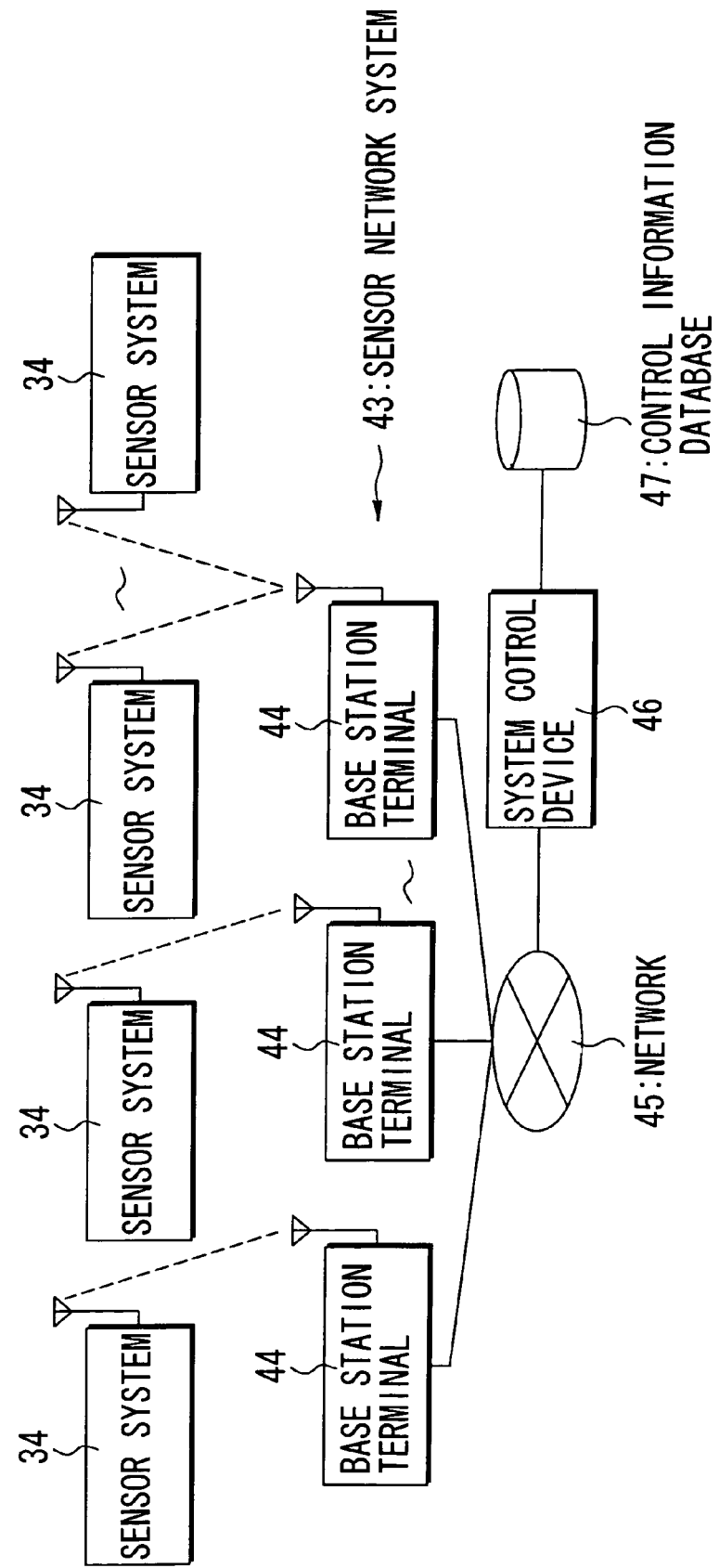
FIG. 21 shows a schematic diagram of an exemplary sensor network system using the sensor system of FIG. 18.
Figure 22:
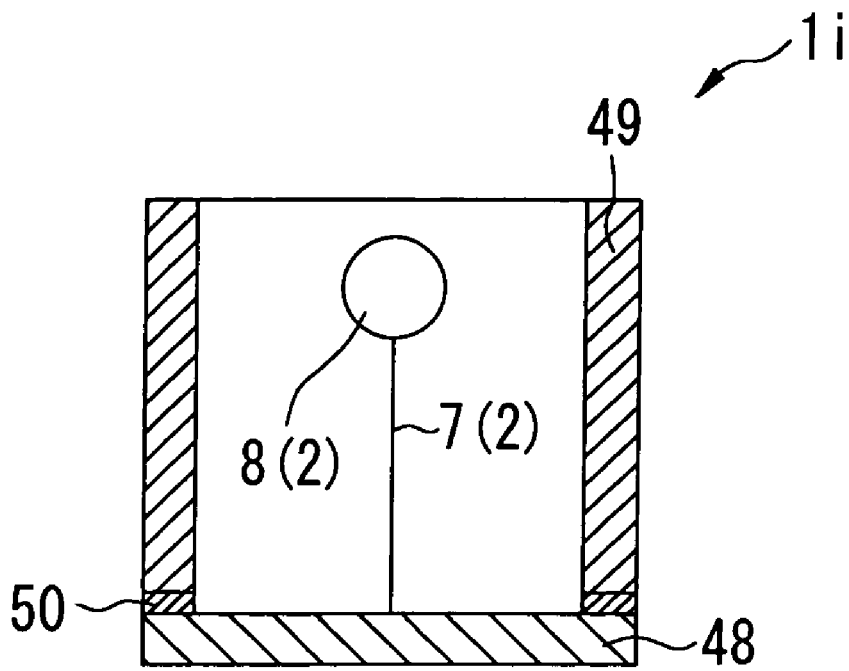
FIG. 22 shows a cross-sectional view of a piezoelectric power generation system of another preferred embodiment in accordance with the present invention.

FIG. 16 shows a schematic block diagram of a piezoelectric power generation system in accordance with a sixth preferred embodiment of the present invention, FIG. 17 shows a schematic circuit diagram of an exemplary rectification/accumulator circuit provided in the piezoelectric power generation system of FIG. 16, FIG. 18 shows a schematic diagram of an exemplary sensor system in accordance with the sixth preferred embodiment of the present invention, FIG. 19 shows a schematic diagram of a typical installation of the sensor system of FIG. 18, FIG. 20 shows a schematic block diagram of an exemplary arrangement of the sensor system of FIG. 18, FIG. 21 shows a schematic diagram of an exemplary sensor network system using the sensor system of FIG. 18.

In the fifth preferred embodiment, the piezoelectric power generation system 25 is a power generator system that converts mechanical energy into electrical energy and stores the electrical energy. The piezoelectric power generation system 25 includes the piezoelectric power generation system 26, and a rectification/accumulator circuit 27, as shown in FIG. 16.

The piezoelectric power generation system 26 may be any one of the piezoelectric power generation systems 1 to 1h of the preceding first to sixth preferred embodiments. The rectification/accumulator circuit 27 rectifies the electrical energy obtained from the piezoelectric power generation system 26 derived from the externally driven vibration and stores the energy.

FIG. 17 shows a schematic circuit diagram of an exemplary rectification/accumulator circuit 27.

The rectification/accumulator circuit 27 comprises of rectification diodes 28 to 31, a charging capacitor 32, and a Zener diode 33. The electrical energy generated by the piezoelectric power generation system 26 is typically alternating current (AC), which is rectified by the rectification diodes 28 to 31 that form a diode bridge. The generated electrical energy is stored in the charging capacitor 32.

The electrical energy stored in the charging capacitor 32 drives the load LD. The Zener diode 33 is provided for the protection of breakdown voltage, such as when the charged energy exceeds the breakdown voltage of the rectification diodes 28 to 31 and the charging capacitor 32.

FIG. 18 shows a schematic diagram of an exemplary sensor system 34 in accordance with the sixth preferred embodiment of the present invention, using a piezoelectric power generation system 25.

The sensor system 34 is a system used in a place where vibration may occur, which system stores generated electrical energy and transmits acquired information to a server when the electrical power is sufficient.

The sensor system 34 comprises a piezoelectric power generation system 26, a semiconductor integrated circuit (signal processor device) 35, a charging capacitor (signal processor) 32, a sensor 36, and a communication antenna (signal processor) 37. On the top of the sensor system 34 is where the piezoelectric power generation system 26 is mounted.

On the bottom of the piezoelectric power generation system 26, a semiconductor integrated circuit device 35 is provided, beneath which a charging capacitor 32 is provided, and beneath which is provided a sensor 36. Some attachment threads are provided beneath the sensor 36.

The sensor system 34 may be, for example, in the form of a cylinder, and the communication antenna 37 is helically formed on the outer circumference of the sensor system 34. The information obtained by the sensor 36 is transmitted via the communication antenna 37.

FIG. 19 shows a schematic diagram of a typical installation of the sensor system 34.

In FIG. 19, the sensor system 34 is mounted on a pipe H for gas and the like. The pipe H (the subject) has a pipe H1 for sensor attachment for mounting the sensor system 34 (attachment joint). The sensor attachment pipe H1 has an inner thread in correspondence with the attachment thread formed on the sensor 36, in order to fix the sensor 36 to the sensor attachment pipe H1 with the thread.

When the pipe H vibrates, the piezoelectric power generation system 26 generates electrical power, which is rectified by the semiconductor integrated circuit device 35 to charge in the charging capacitor 32 up to a predetermined power level. After the power level reaches the predetermined level, the sensor 36 is driven to acquire information.

When a gas or the like is flown in the pipe H, in general not only the pipe H but also the sensor attachment pipe H1 with the sensor system 34 mounted vibrates. The vibration of the sensor attachment pipe H1 is largest in the radial direction of the sensor attachment pipe H1; however, the direction of vibration is not stable.

In this case, since the sensor system 34 uses the piezoelectric power generation system 26 to generate electrical power from any vibration in the radial direction, the sensor system 34 can be installed to the pipe H without concern about the vibration direction of the pipe H.

Accordingly, the thread is sufficient for the means for attaching the sensor system 34 to the pipe H, allowing simplification of the mounting structure of the sensor system 34, while facilitating the mounting procedure, resulting in a significant decrease of labor man-hours and cost.

In the sensor system 34, the piezoelectric power generation system 26 is placed at the furthest position from the sensor 36, because the piezoelectric power generation system 26 is positioned at the furthest point from the pipe H when the sensor system 34 is mounted to the sensor attachment pipe H1. In this manner, at the largest distance from the pipe H, the source of vibration, the vibration is the largest in the sensor system 34, allowing increasing the amount of power generation.

FIG. 20 shows a schematic block diagram of an exemplary arrangement of the sensor system 34.

The semiconductor integrated circuit device 35 includes an A/D (analog to digital) converter 38, a power supply control circuit 39, a microprocessor 40, a radio transceiver circuit 41, and a memory 42. The semiconductor integrated circuit device 35 may be implemented with, but not limited to, a single chip module, and may also be formed from a plurality of IC chips. The piezoelectric power generation system 26, the charging capacitor 32, and the sensor 36 may be implemented as a semiconductor IC circuit. Furthermore, these components may be implemented on a single chip of the semiconductor integrated circuit device 35, or implemented by a plurality of IC chips.

The microprocessor 40 is connected to the A/D converter 38, the power supply control circuit 39, the radio transceiver circuit 41, and the memory 42. The sensor 36 is connected to the A/D converter 38, and the antenna 37 is connected to the radio transceiver circuit 41. The power supply control circuit 39 is connected to the piezoelectric power generation system 26 and the charging capacitance 32.

The microprocessor 40 controls everything in the semiconductor integrated circuit device 35 based on a program stored in the memory 42. The microprocessor 40 has a timer for generating the record of identification information of the sensor system 34 and a signal of a predefined interval.

The A/D converter 38 converts the information obtained from the sensor 36 in analog format into digital format. The power supply control circuit 39 includes the rectification diodes 28 to 31, the Zener diode 33 and the like used in the rectification/accumulator circuit 27 (see FIG. 17), and controls the charging of power supplied from the piezoelectric power generation system 26. The radio transceiver circuit 41 transmits and receives data and communicates through the communication antenna 37. The memory 42 stores the program and temporarily saves data when the program is running.

In the sensor system 34 when the piezoelectric power generation system 26 is used as the power supply, maintenance, such as the replacement of a battery, is not necessary. In addition, wireless communication to the outside allows the sensor system 34 to be power free and wire free.

FIG. 21 shows a schematic diagram of an exemplary sensor network system 43 using the sensor system 34.

The sensor network system 43 includes n sensor systems 34, m base station terminals 44, a network 45, a system control device 46, and a control information database 47.

The base station terminal 44 is provided one for a given area, for receiving information wirelessly-transmitted from one of the sensor systems 34 residing in that area. The base station terminal 44 is connected through the network 45 to the system control device 46.

The system control device 46 receives information from the base station terminal 44 to process data into a desired form. The system control device 46 is connected to a control information database 47. The control information database 47 stores any data processed by the system control device 46.

The sensor system 34 also sends such data as the sensor measurement value, sensor measurement time, sensor network terminal identification information, and so on when it obtains external information from the sensor 36.

Upon reception of information from the sensor system 34, the base station terminal 44, in turn, adds wireless packet reception time, identification information unique to the base station terminal 44 having received the wireless packet to the received information including the sensor measurement value, sensor measurement time, and sensor network terminal identification information, prior to transmitting it over the network 45.

The information transmitted over the network 45 is processed by the system control device 46 for storage in the control information database 47. As can be seen from the foregoing description, deployment of a number of sensor systems 34 in a number of points allows achieving a sensor network system 43, which needs neither battery replacement nor wiring.

It is to be understood that the present invention is not to be limited to the details herein given but may be modified within the scope of the appended claims.

For instance, although the piezoelectric power generation system described and illustrated in FIGS. 1 to 6, 10, and 15 uses a spacer for securing the piezoelectric element into the inner surface of the base, the piezoelectric element 49 in the form of a hollow cylinder may also be secured onto a disk-shape base 48 with a spacer 50 interposed therebetween. The piezoelectric power generation system 1i in this case provides a vibrator 2 comprising a beam 7, and an impact element 8 on the center of the base 48.

As another variation, the piezoelectric element 49 can be fixed onto the base 48 without interposing a spacer 50.

The foregoing description of the preferred embodiments of the present invention has been presented for the purposes of illustration and description. It is not intended to be exhaustive or to limit the invention to the precise form disclosed, and modifications and variations are possible in light of the above teachings or may be acquired from practice of the present invention. The embodiments chosen and described in order to explain the principles of the invention and its practical application to enable one skilled in the art to utilize the present invention in various embodiments and with various modifications as are suited to the particular use contemplated. It is intended that the scope of the present invention be defined by the claims appended hereto, and their equivalents.

What is claimed is:

1. A sensor system comprising in a multilayered lamination:
   a sensor to capture the information about a subject;
   a piezoelectric power generation system to generate power due to vibration of said subject; and
   a signal processing unit operating by the power generated by the piezoelectric power generation system to process and output the information obtained by the sensor;
   wherein
   said sensor is placed at a position nearest to said subject;
   said piezoelectric power generation system is placed at a position furthest from said subject;
   said signal processing unit is placed between said sensor and said piezoelectric power generation system.

2. A sensor system according to claim 1, wherein:
   said piezoelectric power generation system comprises
   a cylindrical piezoelectric element;
   a vibrator including:
     a beam in the form of a rod; and
     an impact element fixed to one end of said beam to impact an inner circumference of said piezoelectric element; and
   a base to fix another end of said beam;
   wherein said piezoelectric element generates power by said impact element vibrating in an arbitrary circular direction perpendicular to a center axis of said piezoelectric element and impacting the inner circumference of said piezoelectric element.

3. A sensor system according to claim 1, wherein
   said piezoelectric power generation system comprises
   a cylindrical piezoelectric element;
   a vibrator including:
     a beam in the form of a rod; and
     an impact element fixed to one end of said beam to impact an inner circumference of said piezoelectric element; and
   a base to fix another end of said beam;
   wherein said piezoelectric element generates power by said impact element vibrating in an arbitrary circular direction perpendicular to a center axis of said piezoelectric element and impacting the inner circumference of said piezoelectric element; and
   wherein said sensor system is secured to a cylindrical attachment joint mounted to said subject with a thread formed on an outer circumference thereof so that a center axis of said sensor system is aligned with a center of axis of said attachment joint.

4. A sensor system according to claim 1, wherein:
   said piezoelectric power generation system comprises:
   a cylindrical impact wall;
   a cylindrical piezoelectric element provided on an inner circumference of said impact wall;
   a beam in the form of a rod, having said piezoelectric element fixed at one end; and
   a base to fix another end of said beam;
   wherein said piezoelectric element vibrates, forced by the vibration in an arbitrary circumferential direction perpendicular to the center axis of said piezoelectric element, to impact the inner circumference of said impact wall to generate electrical power.

5. A sensor system according to claim 1, wherein
   said piezoelectric power generation system comprises:

a cylindrical impact wall;
a cylindrical piezoelectric element provided on the inner circumference of said impact wall;
a beam in the form of a rod, having said piezoelectric element fixed at one end; and
a base to fix another end of said beam;
wherein said piezoelectric element vibrates, forced by the vibration in an arbitrary circumferential direction perpendicular to a center axis of said piezoelectric element, to impact the inner circumference of said impact wall to generate electrical power, and wherein
said sensor system is secured to a cylindrical attachment joint mounted to said subject with a thread formed on an outer circumference thereof so that a center axis of said sensor system is aligned with a center axis of said attachment joint.

* * * * *